US012705653B2

(12) United States Patent
Bathla et al.

(10) Patent No.: US 12,705,653 B2
(45) Date of Patent: Aug. 11, 2026

(54) PROXY PROCESSOR FOR DATA FEEDS

(71) Applicant: Microsoft Technology Licensing, LLC, Redmond, WA (US)

(72) Inventors: Samir Bathla, Woodinville, WA (US); Wei Fang, Calgary (CA); Vinod Krishnan Koduvayoor Subramanian, Sammamish, WA (US); Marcelo M. De Barros, Redmond, WA (US); Sayalee Arun Bhanavase, Vancouver (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 295 days.

(21) Appl. No.: 18/138,539

(22) Filed: Apr. 24, 2023

(65) Prior Publication Data

US 2024/0354822 A1 Oct. 24, 2024

(51) Int. Cl.

| | |
|---|---|
| ***G06Q 30/00*** | (2023.01) |
| ***G06Q 30/0601*** | (2023.01) |
| ***H04L 9/40*** | (2022.01) |

(52) U.S. Cl.

CPC ..... *G06Q 30/0613* (2013.01); *G06Q 30/0631* (2013.01); *G06Q 30/0633* (2013.01); *H04L 63/0884* (2013.01)

(58) Field of Classification Search

CPC ........... G06Q 30/0613; G06Q 30/0631; G06Q 30/0633; H04L 63/0884

See application file for complete search history.

(56) References Cited

U.S. PATENT DOCUMENTS 7,818,399 B1 * 10/2010 Ross, Jr. ............ G06Q 30/0274 709/215
9,183,258 B1 * 11/2015 Taylor ............... G06F 16/24578
2006/0193474 A1 * 8/2006 Fransdonk ............ H04L 63/061 380/279
2009/0043674 A1 * 2/2009 Minsky ............. G06Q 30/0603 715/765
2015/0019341 A1 * 1/2015 Pasila ................ G06Q 30/0267 705/14.64

(Continued)

OTHER PUBLICATIONS

"How Acquirers Can Help Clients Pick the Right Payment Gateway," by Matt Clyne, ISO & Agent 3.6: 58, SourceMedia dba Arizent, Sep. 1, 2014 (Year: 2014).*

(Continued)

*Primary Examiner* — Anne M Georgalas

(74) *Attorney, Agent, or Firm* — Shook, Hardy & Bacon L.L.P.

(57) ABSTRACT

Automatically selecting a proxy processor for handling requests for information related items in a data feed to avoid navigating to a third-party site. The data feed includes displaying a scrollable list of items for selection. The disclosed technology generates recommendation scores associated with respective proxy processors. A recommendation score is based on a weighted sum of parameters associated with acquiring an item using a proxy processor. Selecting a proxy processor includes ranking the proxy processor using the recommendation scores. The selected proxy processor communicates with a plurality of item providers and retailers for a consolidated acquisition process. The disclosed technology further maintains the user on the data feed.

20 Claims, 13 Drawing Sheets

(56) References Cited

U.S. PATENT DOCUMENTS

| | | | | |
|---|---|---|---|---|
| 2015/0227972 | A1* | 8/2015 | Tang | G06Q 30/0255 705/14.53 |
| 2018/0293601 | A1* | 10/2018 | Glazier | G06Q 30/0214 |
| 2019/0318337 | A1* | 10/2019 | Schulz | G06Q 20/202 |
| 2019/0347680 | A1* | 11/2019 | Layman | G06Q 30/0201 |
| 2020/0058029 | A1* | 2/2020 | Spitz | G07F 9/001 |
| 2020/0104909 | A1* | 4/2020 | Hendlin | G06Q 30/0643 |
| 2020/0382480 | A1* | 12/2020 | Isaacson | G06Q 20/384 |
| 2021/0090035 | A1* | 3/2021 | Tate | G06Q 20/027 |
| 2023/0237559 | A1* | 7/2023 | Wang | G06F 3/04842 705/26.81 |
| 2023/0325832 | A1* | 10/2023 | Malasi | G06Q 20/065 705/64 |

OTHER PUBLICATIONS

"System for scoring merchants for payment gateways using Secure Multi Party Computation," IP.com, IPCOM000261529D, Mar. 12, 2020 (Year: 2020).*

* cited by examiner

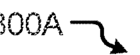

| Proxy Processor ID 302 | Item ID 304 | Item Provider 306 | Inventory status 308 |
| --- | --- | --- | --- |
| ABC | Summer_Dress_Light-Blue_Medium_Regular | Retail-A, Retail-B | Yes |
| ABC | Dress_Shoes_5 | Retail-B | Yes |
| XYZ | Summer_Dress_Light-Blue_Medium_Regular | Retail-C | No |

Recommendation Score 310 = w1*(Price + Shipping fee + Taxes + Duties - Coupons - Cashbacks)
+ w2*(Points/Rewards)
+ w3*(Shipping time)
+ w4*(Return policy)
+ w5*(Merchant credibility)
+ w6*(Other promotions)

Fig. 3B

Fig. 4C
400B
Shopping Feed 402C
Shipping and Payment 420
Shipping Information:
Ship to:
me
123 Main Street, USA
Payment Information:
me
by card
Delivery Method: Standard
Proxy Processor: ABC
Place Request 424
Request Summary 422
Summer Dress
Color: Light Blue Size: M Fit: Regular
Sold by: Retail-A
$800.00 x 1
Dress Shoes
Color: Black Size: 5
Sold by: Retail-B
$150.00 x 1
Items Total $950.00
Shipping & Handling $50.00
Total $1,000.00
Processed through: ABC

Fig. 4D
400B
Shopping Feed 402D
Request Confirmation 420
Request Number 432 #01234567
Your order has been confirmed.
Thank you for shopping with us!
Proxy Processor: ABC
Customer Information
Ship To:
me
123 Main Street, USA
Bill To:
me
123 Main Street, USA
Items Summary 434
Summer Dress
Color: Light Blue Size: M Fit: Regular
Sold by: Retail-A
$800.00 x 1
Dress Shoes
Color: Black Size: 5
Sold by: Retail-B
$150.00 x 1
Items Total $950.00
Shipping & Handling $50.00
Total $1,000.00
Processed through: ABC
Continue Shopping 436

PROXY PROCESSOR FOR DATA FEEDS

BACKGROUND

Data feeds have become a popular browser feature that are used to enable search and display of various related data items. Example data feeds include shopping feeds that display lists of product items for purchase, news feeds that display lists of news headlines, and/or a stock price feeds that display lists of stock prices, among others. In general, data feeds automatically update content as new product items, new headlines or updated stock prices become available or the like. Typical data feeds also provide selectable links corresponding to each item in the data feed such that, when selected by a user, a redirection to another web page or a web domain may occur. For instance, in a shopping feed, when a user selects one of the displayed items, the browser causes a redirection to the merchant's website so the user can find out more information about the product or item and/or purchase the same. While this redirection enables the purchase/sale of the selected item, transferring the user to another website essentially disconnects the user from the current data feed. The loss of connection prevents the user from gracefully resuming browsing on the data feed when desired, e.g., following the purchase of an item without manually reconnecting to the data feed.

It is with respect to these and other general considerations that the aspects disclosed herein have been made. In addition, although relatively specific problems may be discussed, it should be understood that the examples should not be limited to solving the specific problems identified in the background or elsewhere in this disclosure.

SUMMARY

Aspects of the present disclosure relate to maintaining a user on a data feed through the use of a proxy processor for handling redirection requests and other requests. Given that many sites require a user to visit the site in order to conduct business and/or get site-related content, aspects of the present disclosure relate to the use of a proxy processor to access and conduct business on the other site. Other aspects relate to the use of different proxy processors, and, when available, dynamically selecting which proxy processor to use for processing acquisition operations of an item selected in a data feed.

The phrase a "proxy processor" relates to the portion of the system that performs as a proxy for processing an acquisition including, in embodiments, an authentication for permitting access to an item as a part of acquisition operations of an item. In aspects, the proxy processor may be referred to as a gateway for a transaction and/or an acquisition. The proxy processor further connects with a third-party server or site for completing the acquisition operations. Examples of the item include a news article, a product item, a service item or the like.

In accordance with some embodiments, the present disclosure relates to systems and methods for dynamically selecting a proxy processor for processing a data feed according to at least the examples provided in the sections below, including but not limited to a computer-implemented method that comprises displaying a data feed having an automatically updated list of a plurality of items to an end user; receiving a selection of an item of the plurality of items in a data feed; for the selected item, determining a recommendation score for each of a plurality of proxy processors; selecting, based on the recommendation score, a designated proxy processor; sending a request to acquire the selected item to the designated proxy processor; and receiving transaction completion acknowledgement from the designated proxy processor.

In aspects, the recommendation score is based on a weighted sum of a plurality of parameters associated with each of the plurality of proxy processors. With respect to other aspects, the plurality of parameters includes a price of an item, a shipping fee, and a shipping time and/or inventory of the selected item.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTIONS OF THE DRAWINGS

Non-limiting and non-exhaustive examples are described with reference to the following figures.

FIGS. 3A-B illustrate example data structures associated with selecting a proxy processor and a recommendation score in accordance with aspects of the present disclosure.

FIGS. 4A-E illustrate example user interfaces for an item transaction in accordance with aspects of the present disclosure.

Figure 5A:
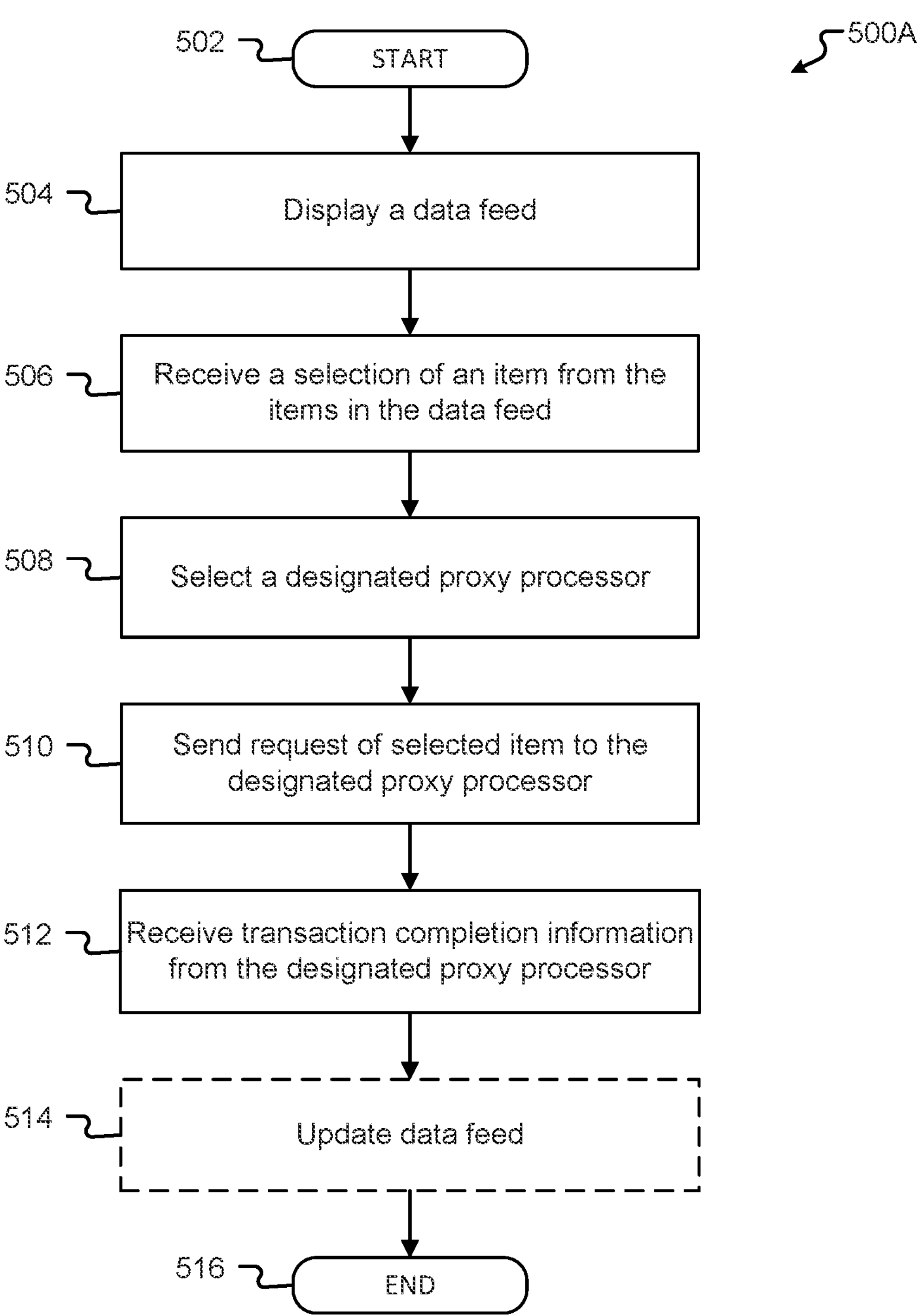
Figure 5B:
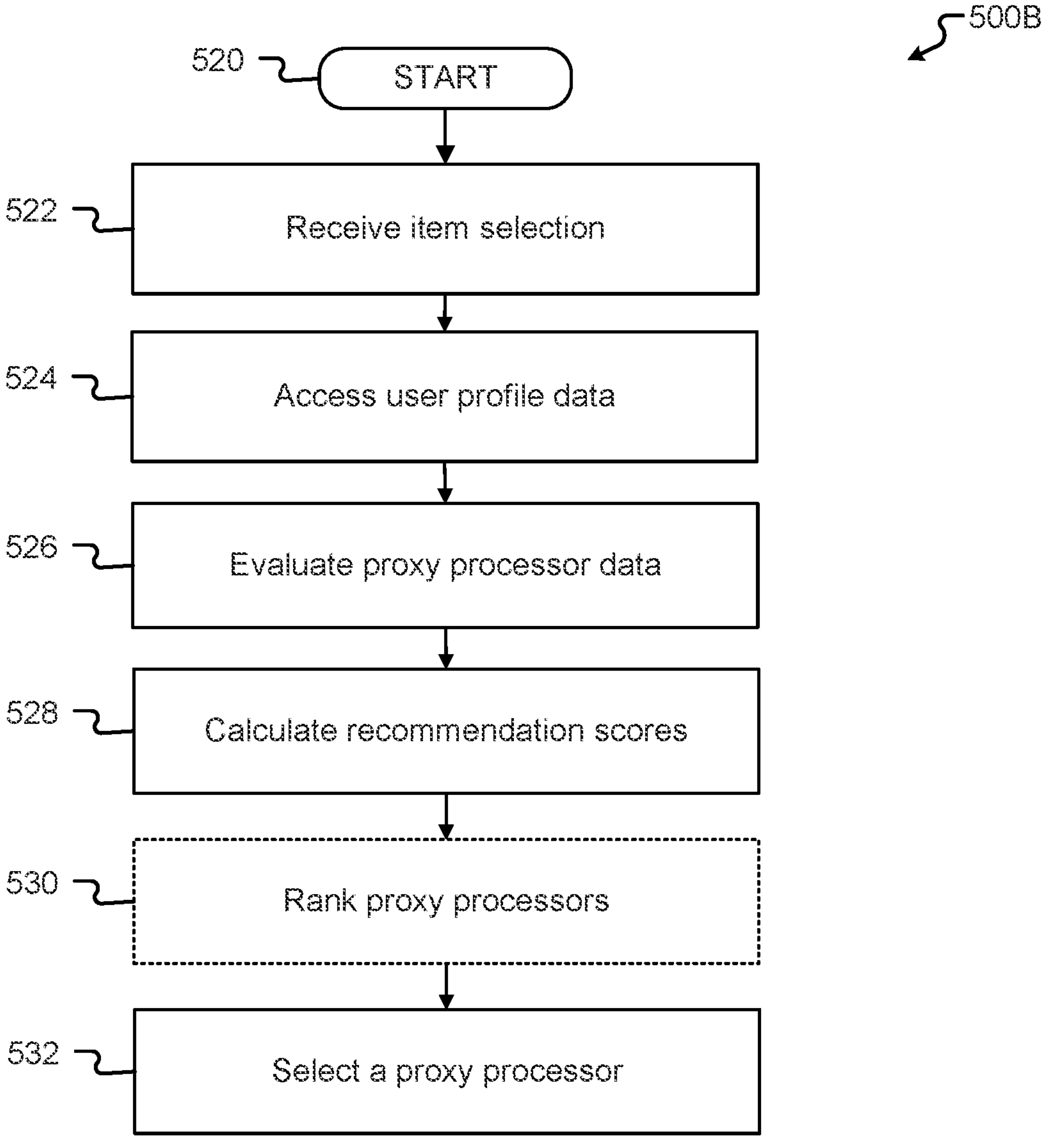
Figure 5C:
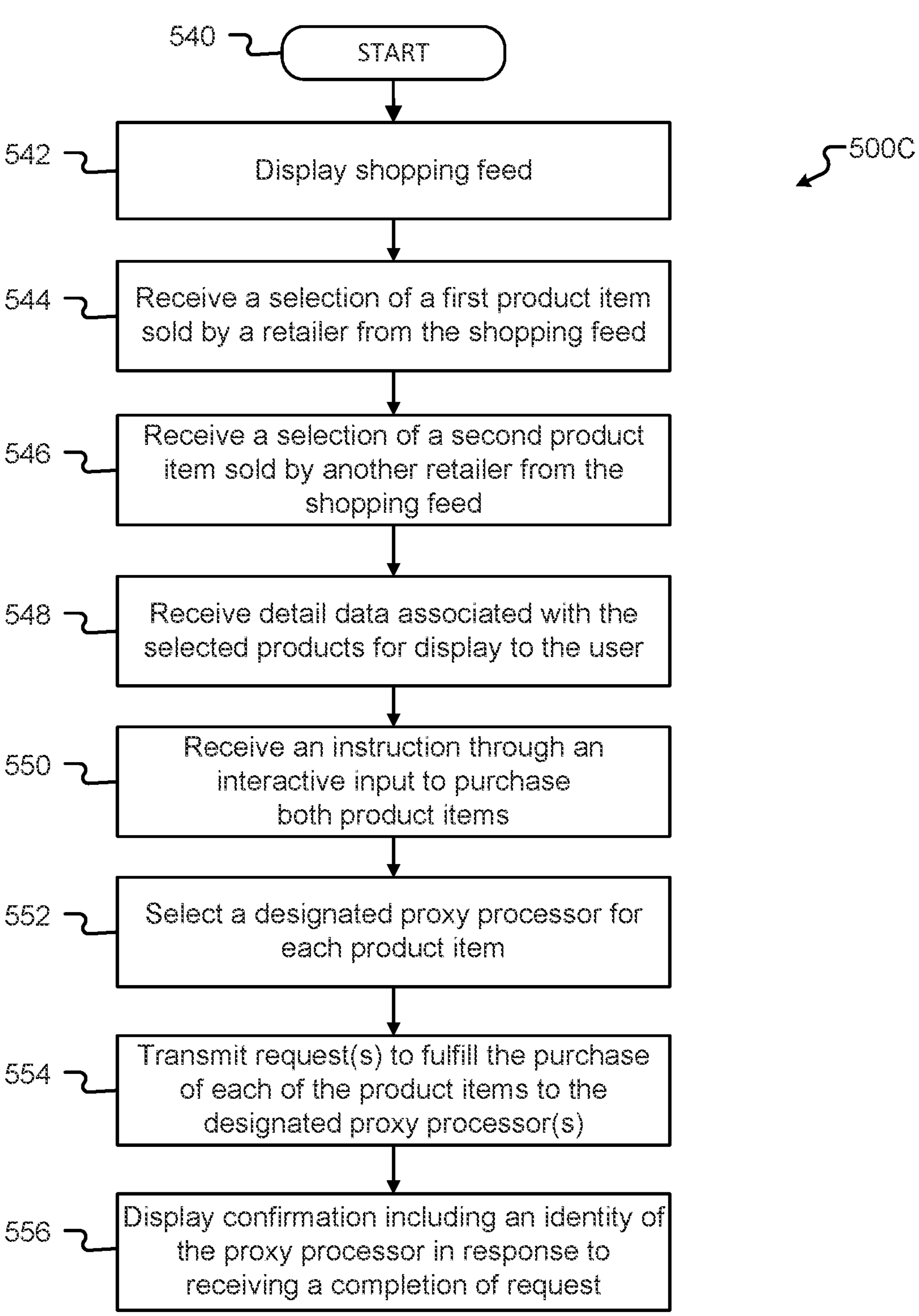

FIGS. 5A-C illustrate examples of methods for dynamically selecting a proxy processor in a shopping feed in accordance with aspects of the present disclosure.

Figure 6:
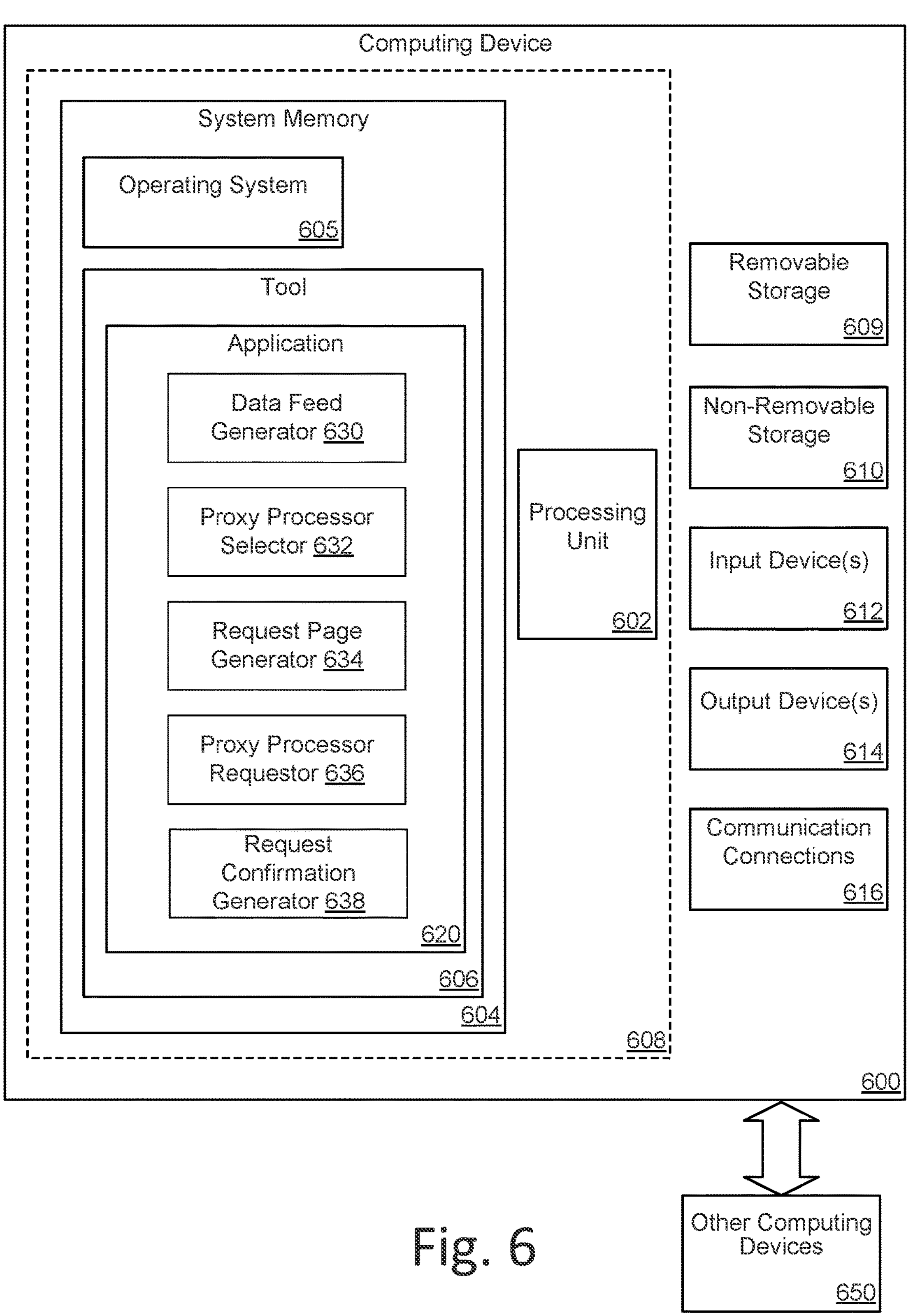

FIG. 6 is a block diagram illustrating example physical components of a computing device with which aspects of the disclosure may be practiced.

Figure 7:
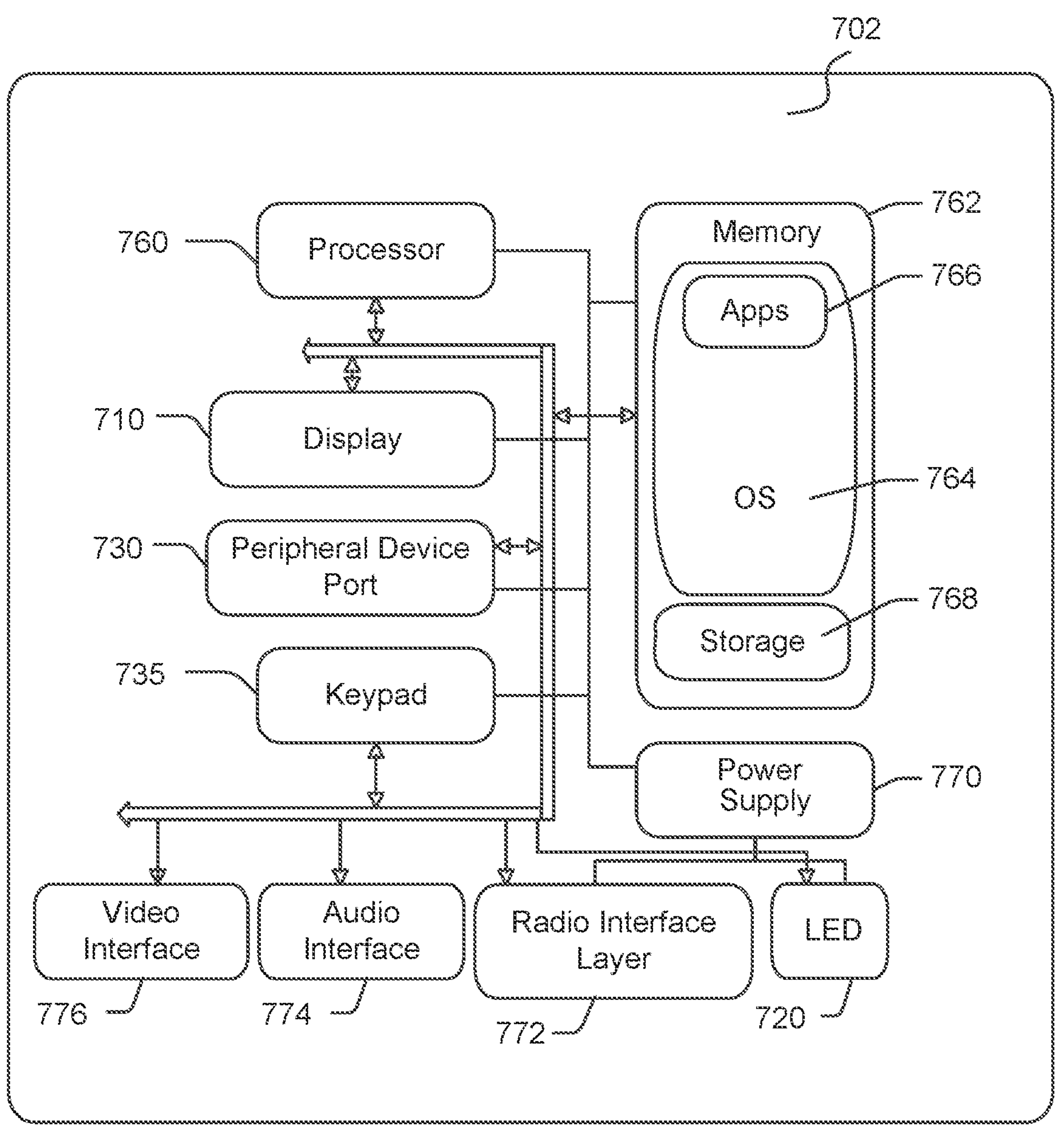

FIG. 7 is another simplified block diagram of a computing device with which aspects of the present disclosure may be practiced.

DETAILED DESCRIPTION

Various aspects of the disclosure are described more fully below with reference to the accompanying drawings, which from a part hereof, and which show specific example aspects. However, different aspects of the disclosure may be implemented in many different ways and should not be construed as limited to the aspects set forth herein; rather, these aspects are provided so that this disclosure will be thorough and complete and will fully convey the scope of the aspects to those skilled in the art. Practicing aspects may be as methods, systems, or devices. Accordingly, aspects may take the form of a hardware implementation, an entirely software implementation or an implementation combining software and hardware aspects. The following detailed description is, therefore, not to be taken in a limiting sense.

The present disclosure relates to data feeds which, in general, display items in a scrollable list. Data feeds are periodically updated based on new items received from item/data providers and/or when information relevant to a particular user changes to cause updated searches to occur. That is, the scrollable list of a data feed is automatically updated when a new item of the user's interest becomes available. In examples, a new item may become available when a data provider (such as a merchant or a news provider) offers a new product or provides a newly available news item, or the like. In other examples, a data feed may be updated with new items when the end user updates their user profile or preferences. Consequently, as used herein, the term "new" may relate to actually new items, such as current news headlines or new products that companies are making available to purchase. In other situations, the term "new" may relate to items that were previously available in general but were not previously presented on a particular user's data feed.

In general, items in a data feed are selectable by a user. Also, when a user selects an item in the data feed, the user is typically provided additional information regarding the selected item. Prior to this disclosure, the user would be transferred to another website that generates the item details page and subsequent web pages associated with authorizing an access to information and/or authorizing/conducting the acquisition of the selected item for the user. For example the user may be authenticated to view a news item on a news feed provided by a publisher and/or authenticated to enable the purchase of the item from the merchant publishing the item for sale on, for example, a shopping feed. Prior to the technology described herein, the user was transferred to a website of a respective item provider, a retailer, or a payment gateway for checkout operations after selecting a product item. These other websites are referred to herein as third-party websites. In these traditional operations, the user would not have a convenient way to return to the data feed upon completion of their viewing/transacting with the third-party website. After a completion of process for gaining access to the news article, the user needs to manually revisit the news feed website to continue receiving the news feed.

In embodiments described herein, data feeds may utilize proxy processors to interact with the third-party websites and thereby maintain users on their data feed instead of redirecting them to the third-party websites. Also, different proxy processors may interact with different third-party websites such that, in other aspects described below, embodiments dynamically select which proxy processor from a plurality of proxy processors for processing requests by users that would otherwise redirect them to the third-party website. Automatically selecting a proxy processor of a plurality of proxy processors for processing a request for acquiring items may involve machine learning model that determines a proxy processor based on various parameters associated with selected items and a status of the proxy processor. For example, the disclosed technology displays a shopping feed, interactively receives a selection of a product displayed in the shopping feed, and dynamically selects a proxy processor for processing purchase/acquisition of the selected product.

The disclosed technology is yet further directed to a use of a proxy processor that may aggregate steps associated with acquisition of selected items provided by providers that are distinct from each other into one operation for the user. Unlike traditional data feeds that forward the user to a website of each item provider (e.g., a retailer) that provide each item of selected items, the present disclosure selects a proxy processor that may perform the acquisition operations such that it may do so for multiple items provided by distinct item providers. In particular, a single request number in request confirmation data represents acquisition operations associated with a plurality of items from a plurality of distinct providers. The acquisition operations include processing by a plurality of distinct item providers through the proxy processor.

Figure 1:
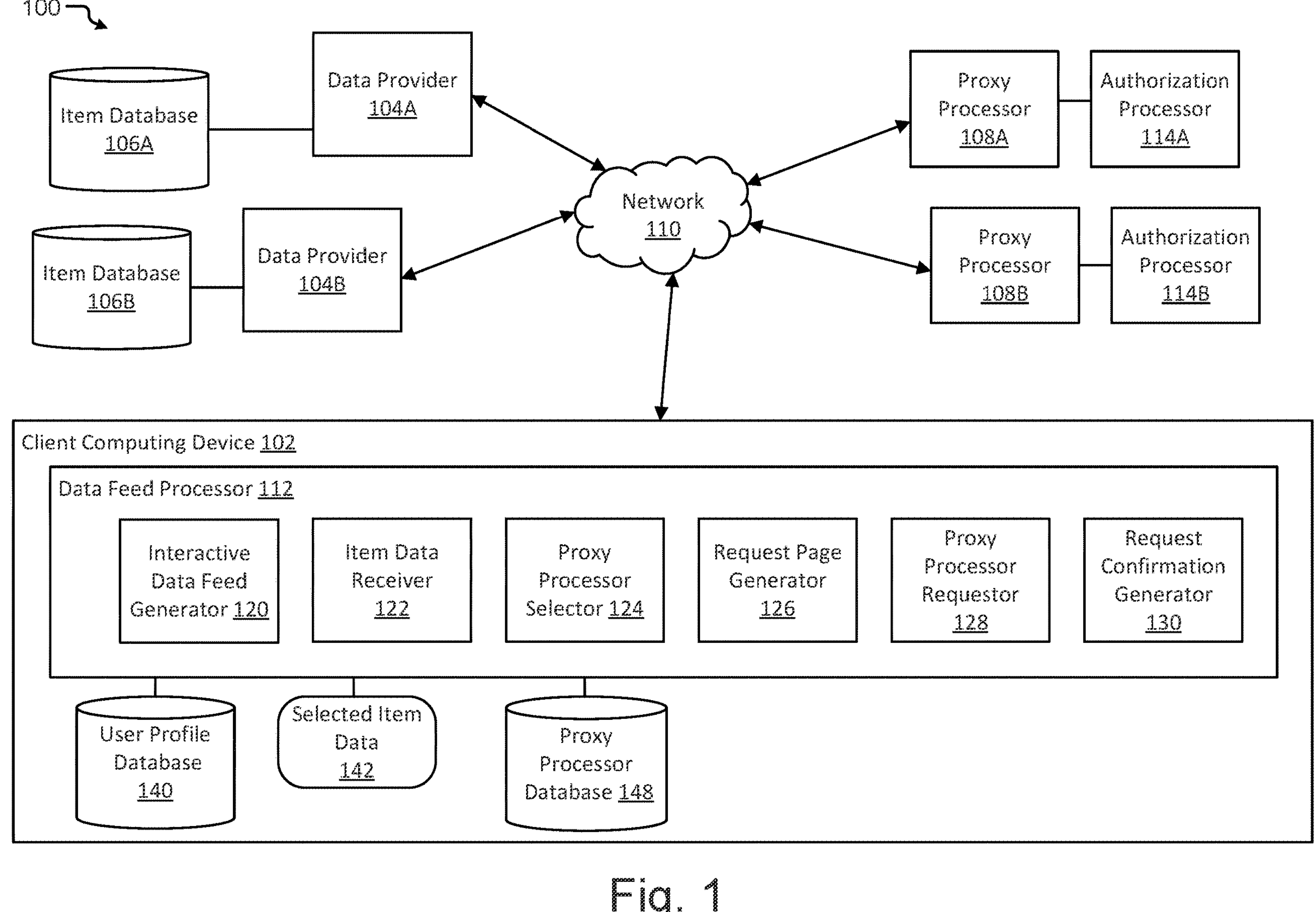
FIG. 1 illustrates an overview of an example system for dynamically selecting a proxy processor in accordance with aspects of the present disclosure.

FIG. 1 illustrates an overview of an example system for using and, in some embodiments, dynamically selecting a proxy processor in accordance with aspects of the present disclosure. A system 100 includes client computing device 102, data providers 104A-104B, item databases 106A-106B, proxy processors 108A-108B, network 110, and authorization processors 114A-114B.

In embodiments, the client computing device 102 comprises a data feed processor 112, as shown in FIG. 1. The data feed processor 112 manages the processing, delivery and display of data or items (e.g., a news feed, a stock price feed, a shopping feed, and the like) through a graphical user interface of the client computing device 102. Although shown as part of the client device 102, it will be appreciated however, the data feed processor 112 may be managed by a service operating on a backend server.

The data providers 104A-104B maintain item data for the data feed managed by data feed processor 112. Item data, as used herein, relates to data or information associated with particular items that a user may wish to acquire, such as a news story or other purchasable good. The data providers 104A-104B may access different item databases 106A-106B, which may store the items (in cases of written material) or information related to the physical item (in cases of physical items for purchase). For example, the data providers 104A-104B may provide news headlines to a news feed managed by data feed processor 112 and news articles upon granting an access by a user through an acquisition operation. In another example, the data providers 104A-104B may provide the item data, such as product data, to an online shopping feed managed by data feed processor 112. The item databases 106A-106B store data associated with the items. Examples of the data associated with the items include, but are not limited to, titles, summaries, and other attributes of a news article, detailed descriptions of a product item and the like for acquisition. A data provider may be associated with one or more item providers (e.g., a merchant, a retailer, a news agency, a stock trade broker, and the like).

The proxy processors 108A-108B, in embodiments, process authentication as a part of acquisition operations in response to receiving a request for acquiring an item from the data feed processor 112. For example, a proxy processor 108A may receive, from the data feed processor 112, a request for authenticating the user and the product items for acquisition operations. Also, in aspects, the proxy processors 108A-108B are associated with one or more data providers, such as 104A or 104B. For example, the proxy processors 108A-108B may correspond to payment gateways, which authenticate the user, and one or both of the data providers 104A-104B. The proxy processors 108A-108B may further authenticate resources needed to perform acquisition operations associated with an item.

In embodiments, the proxy processors 108A-108B use the authorization processors 114A-114B for authenticating users. For instance, the authorization processors 114A-114B respectively authorize access by the user of the client device 102. That is, when user of client device 102 begins steps to acquire an item displayed on the data feed, different steps may be taken to determine if that user has been previously authorized include permitting access to a news article associated with a news headline being selected in the news feed in exchange for a resource needed. In another example, the acquisition operations include a request to ship a product item that has been selected in the product data feed (e.g., the shopping feed). In embodiments, the acquisition begins after authorization is complete.

The data feed processor 112 generates a data feed for an interactive display at the client computing device 102. In response to receiving a user selection of an item on the data feed, the data feed processor 112 selects a designated proxy processor (e.g., 108A or 108B) for handling the user selection, which is typically a request to access the selected item. The data feed processor 112 includes interactive data feed generator 120, item data receiver 122, proxy processor selector 124, request page generator 126, proxy processor requestor 128, and request confirmation generator 130. The data feed processor 112 accesses user profile database 140, selected item data 142, authentication data 144, and proxy processor database 148 to aid in the selection of a designated proxy processor.

The interactive data feed generator 120 generates a data feed by receiving data associated with items from the data providers 104A-104B. The data providers 104A-104B may retrieve the item data from the item databases 106A-106B. For example, the item data may be titles and summaries of a news article and/or a description of a product item for purchase. The interactive data feed generator 120 transmits a data feed over the network 110 to the client computing device 102 for display. In aspects, a user of the client computing device 102 selects one or more items for obtaining further information associated with the items and request for a permission to acquire the items. In aspects, the interactive data feed generator 120 retrieves user profile data associated with the user using the client computing device 102. The user profile data may be stored in a user profile database 140 or elsewhere and may include history data associated with the user requesting news articles previously requested or product items previously purchased.

The item data receiver 122 receives item data associated with an item selected by the user in the data feed. For example, the item data includes content of a news article and/or detailed descriptions of a product item. The item data receiver 122 receives the item data from the data providers 104A-104B. The item data receiver 122 may temporarily store the item data in a location represented by the selected item data 142 of FIG. 1.

In aspects, the proxy processor selector 124 generates recommendation scores associated with the respective proxy processors 108A-108B. A recommendation score is based on a weighted sum of a plurality of parameters associated with selecting a proxy processor that is suitable for an acquisition operation of items. Examples of the plurality of parameters in online shopping include, but are not limited to a price (or price difference), discount and other promotional coupons, a cashback, shipping fees, a shipping time, an inventory of the item, an item provider (e.g., a merchant, a retailer, a news agency, a stock trade broker, and the like), a location of delivering the item, points and reward programs, and a rule pertaining to returning the item after acquisition. In aspects, the proxy processor selector 124 retrieves profile data associated with the user from the user profile database 140 and data associated with the selected item(s) from the selected item data 142. The operation further includes selecting one of the proxy processors 108A-108B and requesting acquisition operations associated with the selected item data 142 to the selected proxy processor. As such, the acquisition operations may take place without transferring to other webpages and websites (e.g., preventing from moving to a website of an item provider).

The proxy processor selector 124 selects one or more of the proxy processors 108A-108B for requesting authentication and further authorizing an access to, or acquisition of, the item. The proxy processor selector retrieves a list of proxy processors from the proxy processor database 148. For example, the list of proxy processors includes information associated with the proxy processors 108A-108B. In aspects, the proxy processor selector 124 ranks proxy processors to select a proxy processor. The ranking is according to a recommendation score. The proxy processor selector 124, in embodiments, further generates the recommendation score based on a weighted sum of parameters associated with user profile data and the respective proxy processors.

The request page generator 126, in embodiments, generates a request page with content including a request for acquiring the item that has been selected from the data feed. The request page may include descriptions of the item that has been selected for acquisition and other information associated with the request. For example, descriptions of a news headline may include a summary of the news article and a news agency. In the shopping feed example, the descriptions of a product item displayed on the request page (e.g., the request summary) may include, but are not limited to, a size, a color, and features of the selected product item, and the like. The request page further includes displaying parameters that are associated with the acquisition operations. Examples of the parameters include shipping and billing information.

The proxy processor requestor 128 transmits a request for authenticating the user, items selected (e.g., the selected item data 142) in the data feed to the selected proxy processor of the proxy processors 108A-108B for authentication and for acquisition. The request includes an identity associated with the user and item data of one or more items that have been selected in the data feed by the user.

The proxy processor requestor 128 receives a result of performing the requested operation from the selected proxy processor of the proxy processors 108A-108B. Based on the received status of the request, the request confirmation generator 130 generates a request confirmation associated with the one or more selected items and may display the confirmation information.

The user profile database 140 includes user profile data associated with the user interacting with the data feed. The user profile data includes history data associated past user selections and other user preferences. For example, the user profile data may include items that the user has selected, date and time of the selections, whether the user has proceeded to acquire the items, and the like. The profile data may further include user preferences of categories of items to include in the data feed. The profile data may further include identity data associated with the user for authentication. In aspects, the proxy processor requestor 128 includes the profile data in a request for authenticating to the proxy processors 108A-108B. As shown, the user profile database 140 is part of client computing device 102 but those skilled in the art will appreciate that the user profile database 140 may relate to one or more sets of data stored locally on the client computing device or on a remote server (not shown).

As will be appreciated, the various methods, devices, applications, features, etc., described with respect to FIG. 1 are not intended to limit the system 100 to being performed by the particular applications and features described. Accordingly, additional controller configurations may be used to practice the methods and systems herein and/or features and applications described may be excluded without departing from the methods and systems disclosed herein.

Figure 2:
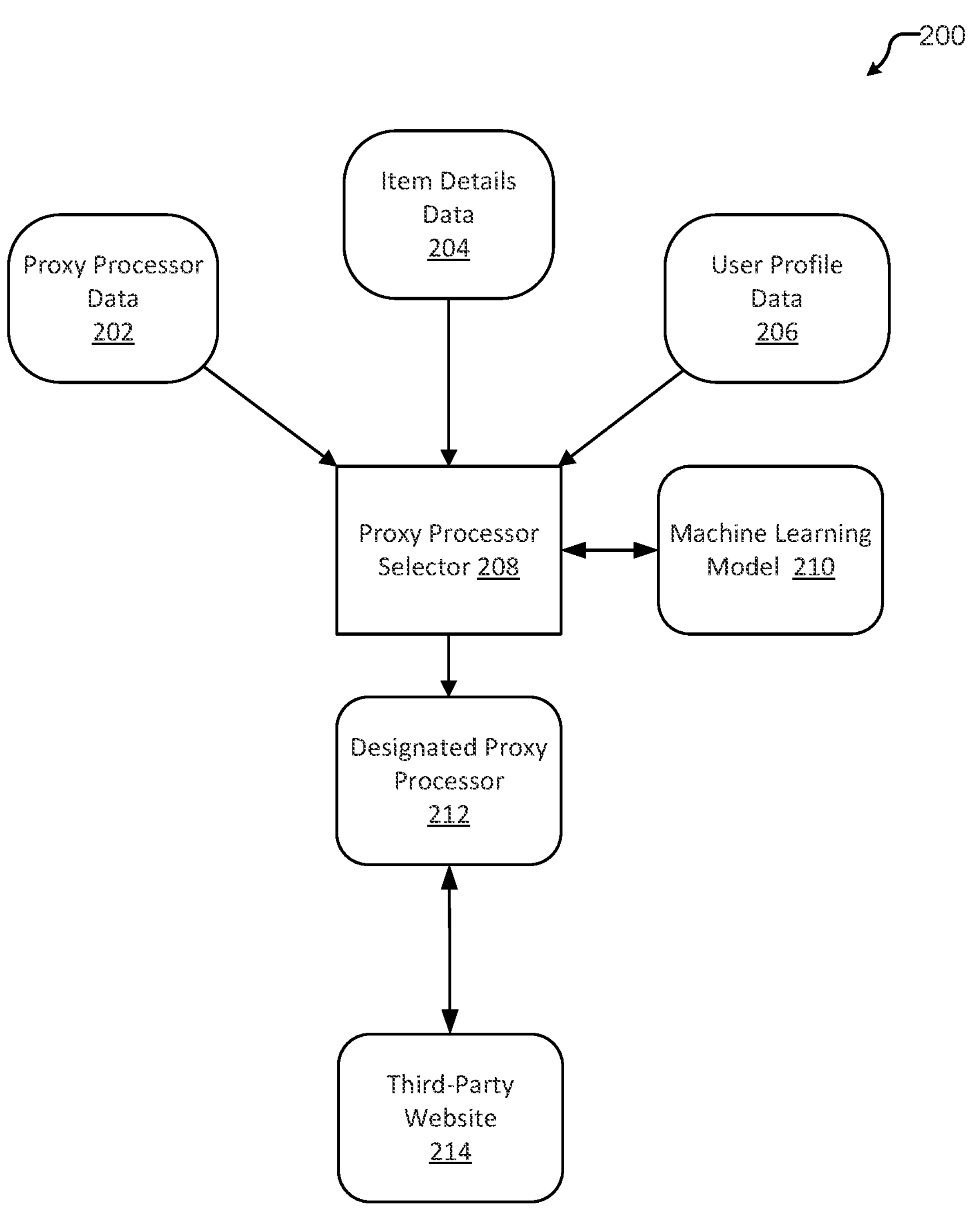
FIG. 2 illustrates another, simplified view of an example system for dynamically selecting a proxy processor in accordance with aspects of the present disclosure.

FIG. 2 illustrates a simplified representation of a system for dynamically selecting a proxy processor in accordance with aspects of the present disclosure. The system 200 includes proxy processor data 202, item details data 204, user profile data 206, proxy processor selector 208, and a machine learning model 210 for determining a designated proxy processor 212 from a plurality of proxy processors. The designated proxy processor 212 then communicates and transacts with a third-party website 214.

The proxy processor selector 208 (e.g., the proxy processor selector 124 as shown in FIG. 1) selects a proxy processor that is the most suitable from a list of proxy processors. The proxy processor selector 208 uses the proxy processor data 202, which includes the list of proxy processors and other information related to the proxy processors, item details data 204, and user profile data 206 as input. The item details data 204 include information associated with an item that has been selected by a user. For example, the item details data 204 may include an identifier of a news heading that has been selected by the user from a news feed, one or more proxy processors that are capable of providing an access to the news article. In some other examples, the item details data 204 include an identifier and a name of a product item that has been selected from a data feed, one or more attributes of the product item (e.g., a color, a size, a price, and the like), and one or more proxy processors associated with an item provider with an inventory of the product item.

The user profile data 206 may further include a location information associated with the user, and an indication of whether the user is associated with a proxy processor (e.g., a member of a transaction provider).

In aspects, the proxy processor selector 208 uses a machine learning model 210 to determine a likely proxy processor to request the acquisition and/or the access based on a set of values of attributes. In examples, the attributes include, but are not limited to, an identifier of a proxy processor, a delivery location of the item, a number of points of a reward program associated with the item, delivery time, a return policy and a rule, a coupon accommodated by the proxy processor, resources required for delivering the item, an inventory of the item, and the like. In examples, the machine learning model 210 may include a neural network that is trained using training data. The training data may include an identifier of a proxy processor and values of the attributes as truthful data. In some other aspects, the machine learning model 210 determines a proxy processor based on recommendation scores associated with respective proxy processors. The recommendation scores may be based on a weighted sum of parameter values associated with executing an acquisition operation as discussed below.

FIGS. 3A-B illustrate example data structures associated with selecting a proxy processor and a recommendation score in accordance with aspects of the present disclosure. FIG. 3A illustrates example data 300A that describes various parameters associated with a proxy processor. In examples, the proxy processor database 148 stores the data 300A. The data 300A includes a proxy processor identifier (ID) 302, an item identifier (ID) 304, an item provider 306, and an inventory status 308. For example, the data 300A in the example indicate proxy processors ABC and XYZ. The proxy processor "ABC" accommodates a request for an item identified as "Summer_Dress_Light-Blue_Medium_Regular" by retailers "Retail-A" and "Retail-B." The inventory status 308 of "Yes" indicates that there is an inventory for this item. The data 300A further indicates a proxy processor identified as "XYZ" accommodates a request for an item identified as "Dress-Shoes-5" by a retailer "Retail-B." The inventory status 308 for this item indicates "Yes." The data 300A further indicates a proxy processor identified as "XYZ" accommodates a request for an item identified as "Summer_Dress_Light-Blue_Medium_Regular" by a retailer "Retail-C." The inventory status 308 indicates "No" (i.e., there is no inventory for this item).

In examples, the proxy processor selector (e.g., the proxy processor selector 124 as shown in FIG. 1) selects a proxy processor identified as "ABC" for requesting a request for performing authentication and subsequent processes for acquiring the item "Summer_Dress_Light-Blue_Medium_Regular." The proxy processor "ABC" has an inventory for this item while "XYZ" does not.

FIG. 3B represents an example calculation for determining a recommendation score for selecting a proxy processor. The method 300B determines a recommendation score 310 based on a weighted sum of a plurality of parameters according to the following equation:

$$\text{Recommendation Score 310} = w1*(\text{Price+Shipping fee+Taxes+Duties−Coupons Cashbacks}) + w2*(\text{Points/Rewards}) + w3*(\text{Shipping time}) + w4*(\text{Return policy}) + w5*(\text{Merchant credibility}) + w6*(\text{Other promotions}).$$

Coefficients w1, w2, w3, w4, w5, and w6 represent weights associated with the respective parameters. The sum (Price+Shipping fee+Taxes+Duties, −Coupons−Cashbacks) represents a total amount of resources (e.g., monetary instruments) needed to acquire an item. In other embodiments, the price value may be a difference in price between using one proxy processor and another. In aspects, the respective weights are predetermined based on user preferences and are stored as a part of user profile data. Values associated with the respective parameters may be predetermined and stored in one of the selected item data (e.g., the selected item data 142 as shown in FIG. 1) and the proxy processor database (e.g., the proxy processor database 148 as shown in FIG. 1). In aspects, the values associated with the respective parameters (e.g., taxes, duties, points/rewards, shipping time, and the like) may be dynamically generated by the request page generator 126 as the user modifies attributes (e.g., shipping address) associated with one or more items on the request page.

Figure 4A:
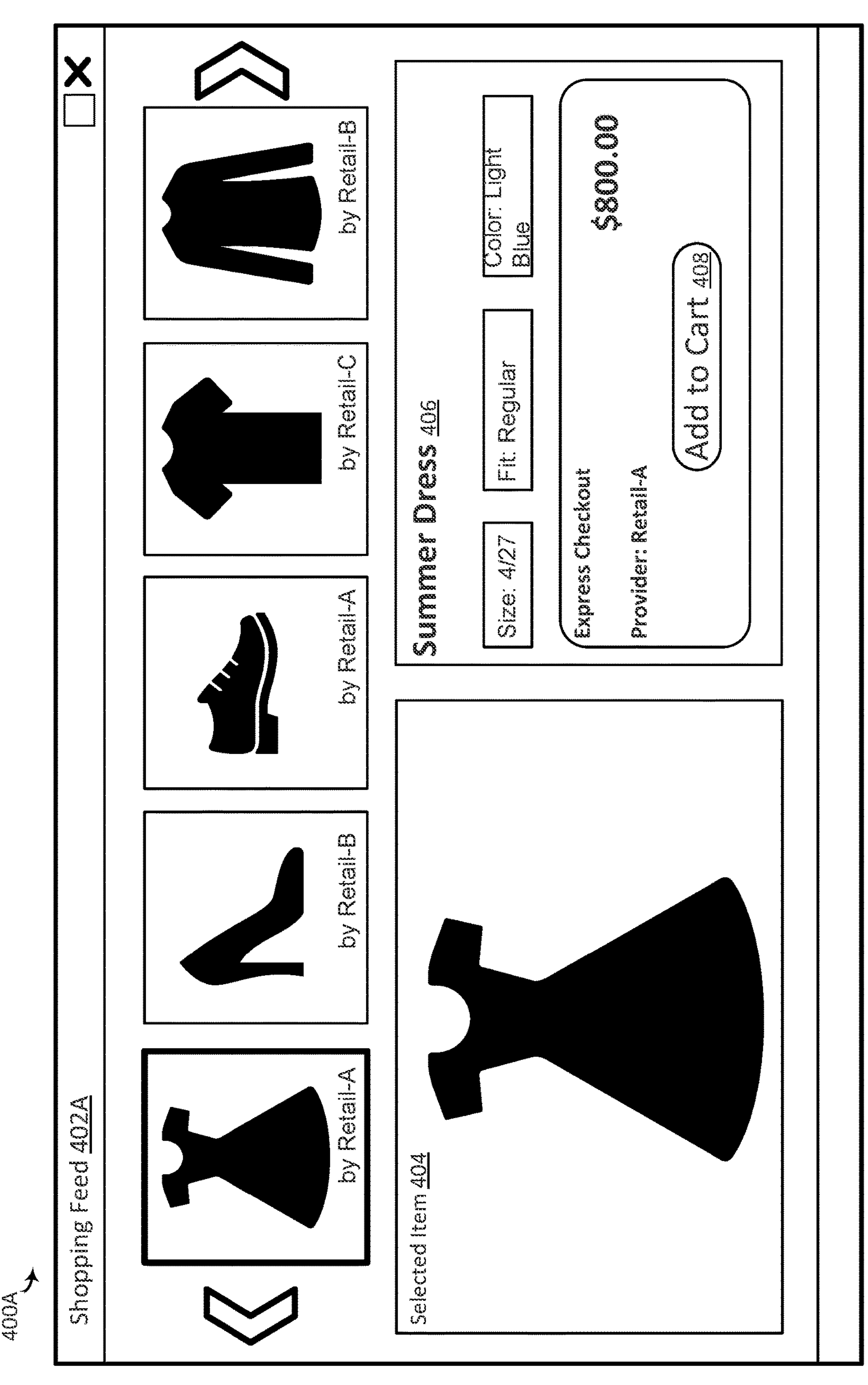

FIGS. 4A-D illustrate example user interfaces for an item transaction in accordance with aspects of the present disclosure. FIG. 4A illustrates an example graphical user interface 400A of a product data feed (e.g., a shopping feed) and information associated with a product item that has been selected from the product data feed. The graphical user interface 400A includes a shopping feed 402A (e.g., a data feed) that includes a horizontal menu of aggregated product items. Each product item includes a picture that represents a product item and an indication of an item provider (e.g., a retailer that sells the item). For example, the shopping feed 402A indicates a horizontally scrollable list of product items including a summer dress, dress shoes, shoes, a short-sleeve shirt, and a long-sleeve shirt. Each product item is displayed in proximity to an indication of an item provider. Some of product items displayed in the shopping feed 402A may be associated with proxy processors and/or item providers that are distinct from one another. In examples, displaying the combination of an item image and an item provider often provides a branding image to the user for enhancing the user experience of understanding the respective product items in the product data feed for acquisition. In aspects, the example graphical user interface is displayed in, but not limited to, a search portal web page in a browser or other applications in a computing device.

The shopping feed 402A further includes a selected item 404. The selected item 404 indicates an item that has been selected from the horizontally scrollable list of product items. Next to the image of the product image indicates product details. For example, Summer Dress 406 identifies the selected dress item, with size 4/27, a regular fit, in a light blue color. The product details page indicates a price (e.g., $800.00) for express checkout and further indicates an item provider (e.g., retailer) of the Summer Dress by "Retail-A." The product details page further includes "Add to Cart" 408 button to add the selected product item to a cart for acquisition. The user may select the "Add to Cart" 408 button to add the selected item to the cart. A cart may include one or more product items for acquisition.

Figure 4B:
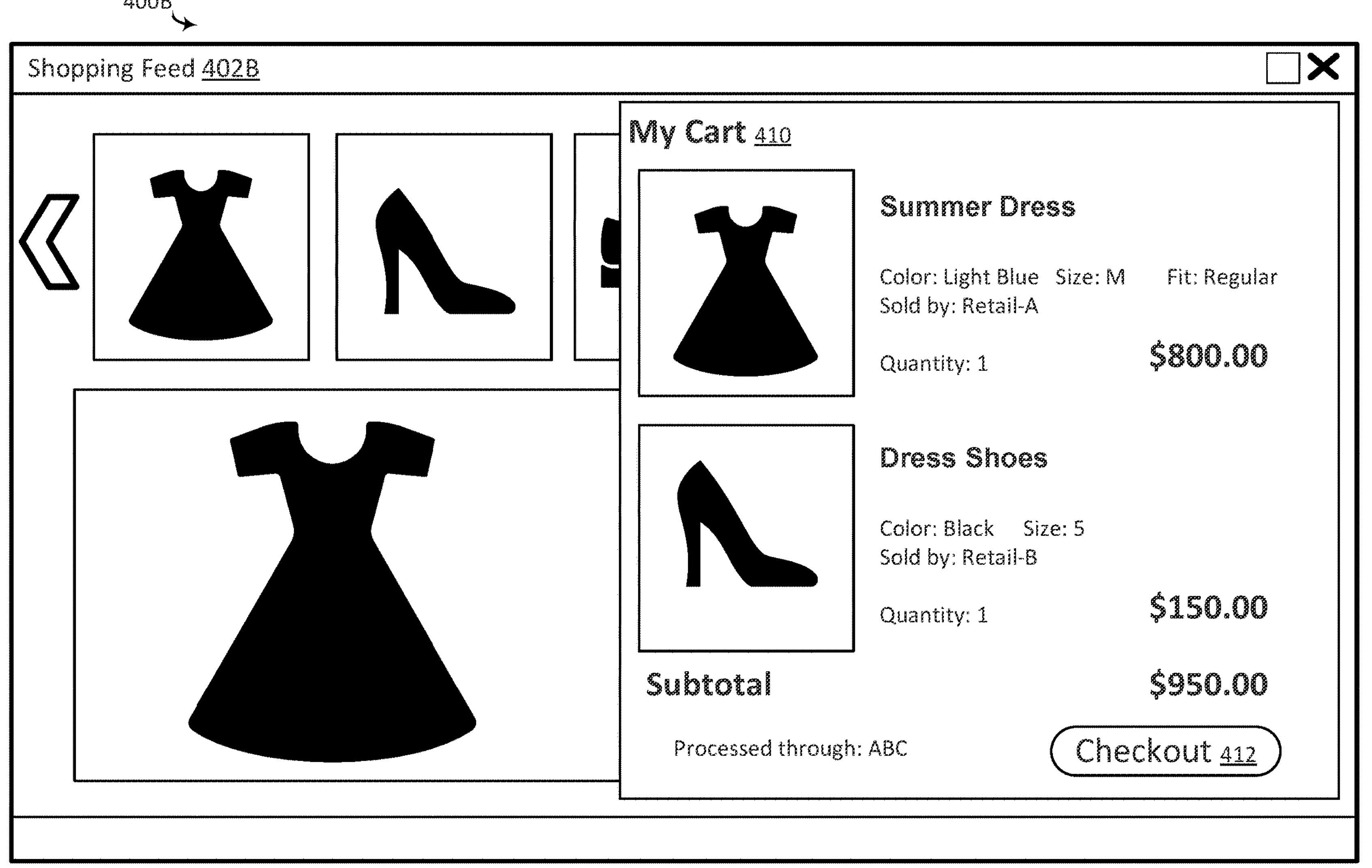

Selecting the "Add to Cart" 408 button causes display cart information before purchasing. FIG. 4B illustrates an example product details page in accordance with aspects of the present disclosure. The graphical user interface 400B includes a shopping feed 402B and My Cart 410, which represents a shopping cart information as the user proceeds to acquiring the items. The My Cart 410 represents a shopping cart associated with the user. The My Cart 410 includes two product items that have been selected in the product data feed: a summer dress and dress shoes. The summer dress is with color light blue, size Medium), and a regular fit. The product item is being provided by a retailer "Retail-A." With a quantity of one, an amount is $800.00. The dress shoes in the shopping cart have black color and a size 5. The dress shoes are being provided by a retailer "Retail-B." With a quantity of one pair, an amount of the dress shoes is $150.00. The cart information further includes a subtotal amount of $950.00. The cart information further indicates that, if proceeding to acquire the shoes, the request will be processed through a proxy processor "ABC". That is, the proxy processor "ABC" accommodates a request of the two items provided by the retailers "Retail-A" and "Retail-B." In examples, the proxy processor is selected based on ranked proxy processors using recommendation scores for selecting a proxy processor. The My Cart 410 area includes a "Checkout" 412 button. By receiving a selection of the "Checkout" 412 button, the operation proceeds to the checkout operation. In aspects, the checkout operation includes confirming shipping and handling information and finally receiving a request for acquisition.

In aspects, one or more attributes or options associated with a product item is interactively editable by the user. For example, a size, a fit, and a color of Summer Dress is changeable by the user by selecting an attribute and changing a value associated with the attribute. A change in a value of an attribute cause regenerating recommendation scores associated with the respective proxy processors. Accordingly, a change in values of attributes of a product item may cause updating a selection of a proxy processor based on ranking of the proxy processors.

Figure 4C:

FIG. 4C illustrates an example graphical user interface 400C for placing a request of acquiring an item in accordance with aspects of the present disclosure. The graphical user interface 400C includes a shopping feed 402C, which includes shipment and payment 420 area. The shipping and payment 420 area indicates request information associated with the selected product items. In aspects, the disclosed technology maintains that the user visiting the webpage of the shopping feed 402C while going through the steps of acquiring the selected items. In examples, the shipment and payment 420 includes shipment information, payment information. The shipment information includes addressee information including a name and an address (e.g., 123 Main Street, USA). The payment information includes a name and a method of payment (e.g., a credit card as a method of providing resources in exchange for the product item). The shipping and payment 420 further include request summary 422 and a "Place Request" 424 button. In examples, the request summary 422 section indicates Summer Dress and Dress Shoes as two product items for acquisition.

The request summary 422 further indicates attributes and prices of the product items. Summer Dress is in color light blue, size Medium, and regular fit. The product item is sold by an item provider (e.g., a retailer) "Retail-A." Price is $800.00×1 (quantity). Dress Shoes is in black color and size 5, and is sold by "Retail-B." Its price is $150.00×1 (quantity). A total amount for the product items is $950.00 and the shipping and handling fee is $50.00. A total amount is $1,000.00. the request summary 422 further indicates a selection of the proxy processor. In examples, the request summary 422 indicates that the request will be processed through "ABC." Values associated with the attributes may be interactively modified by the user. The modifications on the values (e.g., shipping information) may cause other values (e.g., shipping & handling) and a selection of the proxy processor to change accordingly to satisfy the updated request. In examples, the operational step proceeds to transmitting a request for acquisition to the selected proxy processor (e.g., "ABC") in response to receiving a selection of the "Place Request" 424 button.

Figure 4D:

FIG. 4D illustrates an example graphical user interface 400D for confirming a request for acquiring a product item in accordance with the present disclosure. The graphical user interface 400D includes a shopping feed 402D. The shopping feed 402D includes a request confirmation 430 area. The request confirmation 430 includes information associated with a request that has been placed. In examples, the request confirmation 430 includes a request number (e.g., Request #01234567) 432 and information associated with the request number 432. The example indicates "Your request has been confirmed. Thank you for shopping with us! Proxy processor: ABC." The request information further includes customer information. The customer information includes a shipment address (e.g., 123 Main Street, USA) and a billing address (e.g., 123 Main Street, USA). In aspects, the request number is associated with acquisition operations of items that are provided by a plurality of distinct item providers. Here, the request number 432 (e.g., #01234567) is associated with the acquisition operations with Retail-A for Summer Dress and Retail-B for Dress Shoes, both through the proxy processor "ABC".

The request confirmation 430 further includes an items summary 434. The items summary lists the two product items (e.g., Summer Dress in light blue color, size Medium, a regular fit, sold by a retailer "Retail-A" at $800.00×1 (quantity), and Dress Shoes in black color, size 5, sold by a retailer "Retail-B" at $150×1 (quantity). An amount for the product items is $950.00 with the shipping and handling fee of $50.00. The total amount is $1,000.00, the acquisition operation processed by a proxy processor "ABC."

The request confirmation 430 includes a "Continue Shopping Feed" 436 button. In response to interactively receiving a selection of the "Continue Shopping Feed" 436 button, the display proceeds to displaying the scrollable list of product items in a shopping feed (e.g., shopping feed 402A as shown in FIG. 4A). As detailed above, the present disclosure maintains the user visiting the product data feed webpage while undertaking the checkout and request confirmation operations. Unlike the traditional technologies that necessitated the user navigate to another webpage and/or another web domain for checkout, for request confirmation, and other operations, the user stays on the data feed webpage (e.g., in the same web domain) according to the present disclosure.

Figure 4E:
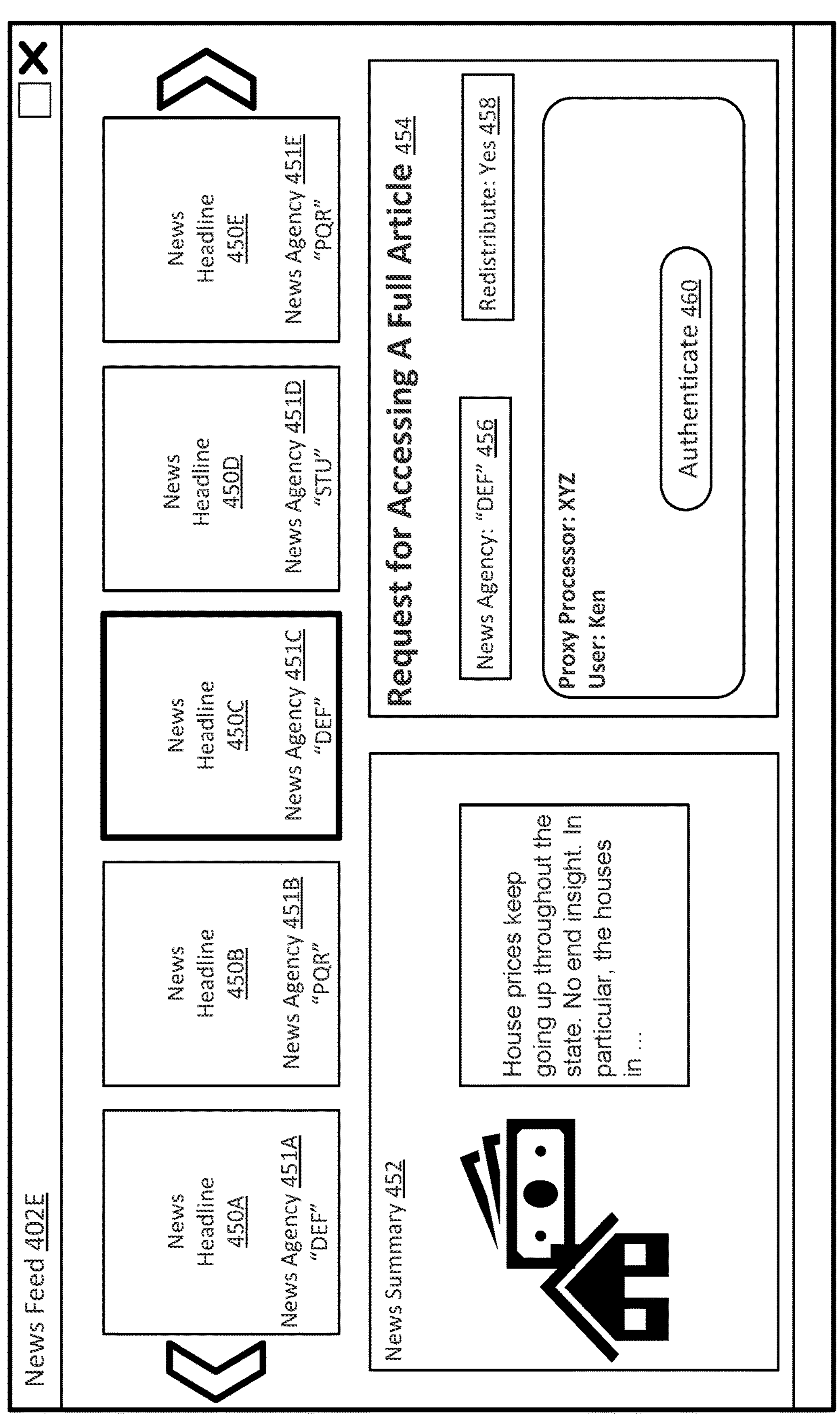

FIG. 4E illustrates an example graphical user interface of a news feed in accordance with aspects of the present disclosure. The graphical user interface 400E includes a news feed 402E. The news feed 402E includes a horizontally scrollable list of news headlines 450A-450E. The respective news headlines 450A-450E further indicates news agencies 451A-451E that report the respective news. For example, a news headline 450A is based on a news reported by a news agency "DEF," a news headline 450B reported by "PQR," a news headline 450C by "DEF," a news headline 450D by "STU," and a news headline 450E by "PQR." Under the scrollable horizontal list of news headlines 450A-450E, the news feed 402E displays a news summary 452 of a selected news headline 450C (shown as highlighted). As an example, the news summary 452 includes a picture of a house and an article summary ("House prices keep going up throughout the state. No end in sight. In particular, the houses in . . . ").

The news feed 402E further includes an area indicating a request 454 for accessing a full article. When the user wishes to obtain a permission to access a full article associated with the news summary 452, the user needs to authenticate its user identify and obtain authorization to access the full article. The request 454 area includes a name of a news agency "DEF" 456 and whether the access to the full article includes a permission to redistribute the full article ("Yes" 458). The request 454 area further indicates a proxy processor being selected (e.g., "XYZ") for transmitting a request for the full article, a username ("Ken"), and an "Authenticate" 450 button. In response to receiving an interactive selection of the "Authenticate" 450 button, the operation proceeds to transmitting a request for authentication to the selected proxy processor "XYZ" for authenticating the user "Ken" and for authorizing the user an access to the full article of the selected news.

In aspects, distinct news agencies (e.g., "DEF," "PQR," and the like) have distinct methods of authenticating the user and authorizing an access to the respective full news articles. One or more proxy processors are associated with one or more news agencies to authenticate the users and to continue the authorization process for granting permissions to access full articles. The disclosed technology selects a proxy processor (e.g., the proxy processor 108A as shown in FIG. 1) from a plurality of proxy processors (e.g., the proxy processors 108A-108B as shown in FIG. 1. The selecting a proxy processor may include generating recommendation scores associated with the respective proxy processors and may further include a use of a machine learning model for predicting a proxy processor based on various weighted parameters including user profile data, pricing, news agencies associated with the respective proxy processors, and the like.

FIGS. 5A-C illustrate examples of methods for dynamically selecting a proxy processor in a data feed in accordance with aspects of the present disclosure. A general order of the operations for the method 500A for selecting a proxy processor and generating a request for acquisition of an item through the proxy processor is shown in FIG. 5A. The method 500A may include more or fewer steps or may arrange the order of the steps differently than those shown in FIG. 5A. The method 500A can be executed as a set of computer-executable instructions executed by a computer system and encoded or stored on a computer readable medium. Further, the method 500A can be performed by gates or circuits associated with a processor, an ASIC, an FPGA, a SOC or other hardware device. Hereinafter, the method 500A shall be explained with reference to the systems, components, devices, modules, software, data structures, data characteristic representations, signaling diagrams, methods, etc., described in conjunction with FIGS. 1, 2, 3A-3B, 4A-4E, 5B-5C, 6, and 7.

As shown in FIG. 5A, flow 500A generally begins with start operation 502. Once started, display operation 504 displays the data feed on a graphical user interface. Display operation 504 is intended broadly to capture the concepts around searching and/or accessing the content for display, formatting the display and ultimately displaying the data feed. In examples, the data feed is displayed in a web portal (sometimes referred to as a web search portal page) in a web browser or other search-based application. In aspects, the data feed includes an automatically updated, scrollable list of items, and display operation 504 relates to such display of the automatically updated items. As discussed above and is known in the art, at least some items shown as part of the data feed may be interactively selected by the user that constitutes a request for more information (e.g., details) associated with the selected item and/or a request to purchase the item. For example, the data feed may be a shopping feed that displays product items in a horizontally scrollable list of the product items. One or more product items on the shopping feed are selectable and are available for purchase. As will be appreciated by those skilled in the art, aspects of display operation 504 may involve accessing a service that manages the display feed and receiving the same over a network for display.

Next, while the data feed is being displayed, receive selection operation 506 receives a selection of an item from the list of items in the data feed. The selection may be interactively made by the user operating a graphical user interface of the data feed using the client computing device, such as client computing device 102 shown in FIG. 1. In aspects, the receive operation 506 may receive more than one item being selected by the user.

Upon receiving the selection at operation 506, select operation 508 selects a designated proxy processor from a plurality of proxy processors to handle the user selection, where handling the user selection may include displaying additional information regarding the item, authenticating the user, and/or begin the process of purchasing the selected item. In some embodiments, there may be only one proxy processor able to handle the supply of the information and/or facilitate the purchase of the item such that the select operation is straightforward. In other embodiments however there may be a plurality of proxy processors able to handle such requests. At a high level, the select operation 508 evaluates the different proxy processors based on their ability to fulfil the request and other criteria to select the proxy processor used to fulfill the request, herein referred to as the designated proxy processor. Additional details of contemplated embodiments related to selecting of the designated proxy processor are discussed below in conjunction with FIG. 5B.

Next, send operation 510 sends a request related to the selected item in the data feed to the designated proxy processor. The request relates to viewing more information related to the item, downloading the item (e.g., for a news story or white paper or the like), or purchasing the item, or the like. The designated proxy processor may authenticate the user after receiving the request and/or cause an authorization processor to authorize (e.g., providing a permission for) accessing the item. In embodiments, the request is a default request where the item of interest is the subject of the default request. For instance, when the data feed is a shopping feed, the request may be a request for more information related to the product and an opportunity to purchase the same. In another example, when the data feed is a news feed, the default request may be a request to view the news story and the designated proxy processor handles the authorization of the user to view the story and the delivery of the same to the user.

Next, receive operation 512 receives information related to the completion of the transaction performed by the proxy processor. While other intermediate events may occur before completion of the transaction, it will be appreciated that the flow returns the user to the data feed once the transaction is complete and receive operation 512 relates to such completion.

Update data feed operation 514 then updates the data feed. Update data feed 514 is shown in dashed lines as an optional step. Those skilled in the art will appreciate that the flow 500A may end once the receive operation 512 occurs but, in most cases, the data feed is relatively constantly being updated and displayed to the user when the user is active on the feed. In embodiments, flow could then pass back to display operation 504, or as shown, it can end at end operation 516. In essence, the data feed is resumed when interactive processing of the request for acquiring items completes. As detailed above, the method 500A maintains the user visiting the data feed webpage throughout the steps. The user is not transferred to another webpage for undertaking the steps for placing a request for acquiring items.

As should be appreciated, operations 502-516 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

FIG. 5B illustrates an example of a method for selecting a proxy processor in accordance with the present disclosure. A general order of the operations for the method 500B is shown in FIG. 5B. The method 500B may include more or fewer steps or may arrange the order of the steps differently than those shown in FIG. 5B. The method 500B can be executed as a set of computer-executable instructions executed by a computer system and encoded or stored on a computer readable medium. Further, the method 500B can be performed by gates or circuits associated with a processor, an ASIC, an FPGA, a SOC or other hardware device. Hereinafter, the method 500B shall be explained with reference to the systems, components, devices, modules, software, data structures, data characteristic representations, methods, etc., described in conjunction with FIGS. 1, 2, 3A-3B, 4A-4E, 5A, 5C, 6, and 7.

Following start operation 520, the method 500B begins with receive 522. In aspects, the item selection is associated with an item that has been selected from a list of items in a data feed by a user. Receive item selection 522 relates to and/or is similar to receive operation 506 described above in conjunction with FIG. 5A. Also, in some embodiments, receive operation 522 may further access and/or receive additional details about a particular selected item. The details may be in a local datastore or may be remotely accessed by the flow 500B. Such additional detail may relate to item specifics, such as the retailer and/or the third-party website where the item may be located or purchased. Such information can then be used to help determine and/or designate a proxy processor for handling the request associated with receiving the item selection.

Next, access user profile data operation 524 accesses profile data associated with a user operating the data feed, e.g., the user of the client computing device 102 shown and described above in conjunction with FIG. 1. The user profile data may be stored in a remote user profile database and/or in a local memory to improve processing. The profile data may include information associated with user identity, information associated with authenticating the user, and the like. The profile data may further include one or more preferred categories of items to be used for the data feed, a history of user searching for various categories of items and/or other data related to the user. Those skilled in the art will appreciate the different types of data that may be collected, stored and accessed to help select a designated proxy processor.

Evaluate proxy processor data 526 then evaluates information related to at least two or more potential proxy processors. As may be appreciated, if only one proxy processor is available then flow can skip to 532 and select that one processor. On the other hand, as shown in FIG. 5B, if there two or more proxy processors, then a selection of one occurs, and therefore, associated data regarding each of the proxy processors is evaluated. In embodiments, proxy processor data is received from a proxy processor database where such data includes an identifier of a proxy processor, one or more item providers associated with the proxy processor, one or more items associated with the proxy processor, and whether the one or more item providers associated with the proxy processor has an inventory of the respective one or more items. For example, an item provider in a shopping feed corresponds to a retailer or a retail distributer. An item provider in a news feed corresponds to a news agency that publish a news article. An item provider in a stock price feed corresponds to a stock trade processor for trading a stock.

Next, in embodiments, calculate recommendation scores 528 calculates recommendation scores for each of the proxy processors. The scores may be based on relevant data associated with the capability of each of proxy processor to fulfill the request. In aspects, the recommendation score indicates a level of recommending a proxy processor for transmitting a request for acquiring selected items. The recommendation score may be based on a weighted sum of parameters associated with determining a proxy processor to transmit the request. Examples of the parameters include, in a shopping feed, a price of an item, a discount coupon and cashback available for acquiring the item, shipping fee associated with the request, a shipping location, points and rewards program offered to the user by the retailer, a shipping time, and a return policy. Other parameters may include whether the proxy processor and the one or more item providers associated with the proxy processor has an inventory of the selected one or more items according specific details as specified by the user (e.g., size, color, and the like). Weight values associated with the respective parameters may be predefined and stored as a part of the proxy processor data. Additionally, or alternatively, the weight values may be stored as a part of user profile data in the user profile database. As will be appreciated, the recommendation scores vary depending on the item selected.

Next, in embodiments, there is an optional rank operation 530 which ranks the proxy processors, e.g., based on the respective recommendation scores, or other parameters. For example, a proxy processor that is out of inventory of the items maybe at the lowest rank. In another example, a proxy processor with the shorter shipping time may be ranked higher than other proxy processors according to a user preference as indicated in the user profile data. Rank operation 530 is shown as optional because some embodiments may simply select the highest score without formally ranking each of the proxy processors.

At select operation 532, a proxy processor is selected from a set of scored and/or ranked proxy processors. In examples, the select operation 532 selects a proxy processor that satisfies the needs based on item selections and user preferences associated with various parameters for recommending the proxy processor. Once selected, the proxy processor, which may then be considered the designated proxy processor may be used to fulfill the user request of the user.

As will be appreciated, operations 522-532 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

FIG. 5C illustrates a more specific exemplary method for a client computing device to interactively display a shopping feed and provide for the purchase of a plurality of items in accordance with aspects of the present disclosure. A general order of the operations for the method 500C is shown in FIG. 5C. The method 500C may include more or fewer steps or may arrange the order of the steps differently than those shown in FIG. 5C. The method 500C can be executed as a set of computer-executable instructions executed by a computer system and encoded or stored on a computer readable medium. Further, the method 500C can be performed by gates or circuits associated with a processor, an ASIC, an FPGA, a SOC or other hardware device. Hereinafter, the method 500C shall be explained with reference to the systems, components, devices, modules, software, data structures, data characteristic representations, signaling diagrams, methods, etc., described in conjunction with FIGS. 1, 2, 3A-3B, 4A-4E, 5A-5B, 6, and 7.

Following start operation 540, the method 500C begins with display shopping feed 542, in which shopping feed data is received from the data feed processor and then displayed to the user on the user computing device. The shopping feed data includes an automatically updated list of a plurality of product items for display and represents an interactive scrollable list of product items. Each product item may be represented by an icon that characterize the product item, a name of the product item, and a name of a retailer (e.g., an item provider) for acquiring the product item.

At receive operation 544, a user selection of a product item from the shopping feed is received. In this example, the selection indicates the user's intent to purchase the product item. In examples, the selection is indicated by highlighting the product item in displaying the shopping feed. Similarly, at receive selection operation 546, the system receives a selection of another product item. That is, an interactive selection of a second product item from the shopping feed is then received. In this example, the second product item is sold by a second retailer that is distinct from the first retailer.

At receive detail data of a request operation 548, detailed data associated with the product items is received from the data feed processor for display on the client computing device. In aspects, the detail data is displayed to the user to enable the user to decide whether to confirm a purchase request. In other embodiments, the detail data may include price information, shipping information, size information, and the like. The detail data may further indicate a proxy processor that is capable of processing a request to purchase each item. In aspects, the client computing device displays the detail data as a product details page as a part of the interactive shopping feed, without leaving the website for the shopping feed.

At receive instruction operation 550, an instruction is received from the user through an interactive input to proceed with the purchase of the product items. In this example a single request may be made by the user to indicate the intent to purchase both items. For instance, the user may be presented with an option to "Checkout" or "Purchase Items". When selected by the user, computer system receives the request to purchase the items, i.e., the instruction through interactive input to purchase both product items.

Next, at select operation 552, flow 500C selects a designated proxy processor for each of the items. The selection process may be similar to the selection process shown and described above with respect to FIG. 5B. That is, a plurality of proxy processors may be evaluated, scored and ranked according to weighted formulas. Upon selection, then each item will be associated with a designated proxy processor for handling the request. In an embodiment, the same proxy processor is selected for each item as would be selected if only one item had been selected for purchase. In another embodiment however, given that more than one item is selected for purchase, the scoring may end up modified if, for instance, one proxy processor can handle purchase of the two items collectively. In such a case the shipping charge may be reduced if only one package may be needed. Consequently, the designated proxy processor may be based on a combination of retailers associated with the product items selected, user profile data, and proxy processor data using a machine learning model and/or the recommendation scores.

Next, transmit operation 554 transmits at least one request to fulfill the user request to purchase at least one of the items. In purchasing the two items, a single request may be transmitted to the one designated proxy processor for handling both purchases. When one designated proxy processor is not handling the purchase of both items then transmit operation 554 will send two separate requests to two separate proxy processors for handling the purchase of the items.

The client computing device subsequently receives from the data feed processor a result of processing the request, e.g., at display confirmation operation 556. In embodiments, the confirmation includes an identity of the proxy processor that has processed the request, in addition to details of the request including information of the product items acquired. After receiving the result of processing the request, the client computing device may further receive an updated shopping feed data for resuming display and browsing of the shopping feed. As detailed above, the disclosed technology enables resuming the shopping feed after completing the acquisition operations by maintaining the user of the client computing device accessing the website (e.g., a web domain) of the shopping feed throughout the acquisition operations.

As should be appreciated, operations 540-556 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

FIG. 6 is a block diagram illustrating physical components (e.g., hardware) of a computing device 600 with which aspects of the disclosure may be practiced. The computing device components described below may be suitable for the computing devices described above. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories. The system memory 604 may include an operating system 605 and one or more program tools 606 suitable for performing the various aspects disclosed herein such. The operating system 605, for example, may be suitable for controlling the operation of the computing device 600. Furthermore, aspects of the disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610.

As stated above, a number of program tools and data files may be stored in the system memory 604. While executing on the at least one processing unit 602, the program tools 606 (e.g., an application 620) may perform processes including, but not limited to, the aspects, as described herein. The application 620 includes data feed generator 630, proxy processor selector 632, request page generator 634, proxy processor requestor 636, and request confirmation generator 638 as described in more details in FIG. 1. Other program tools that may be used in accordance with aspects of the present disclosure may include electronic mail and contacts applications, word processing applications, spreadsheet applications, database applications, slide presentation applications, drawing or computer-aided application programs, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units, and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 600 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general-purpose computer or in any other circuits or systems.

The computing device 600 may also have one or more input device(s) 612, such as a keyboard, a mouse, a pen, a sound or voice input device, a touch or swipe input device, etc. The output device(s) 614 such as a display, speakers, a printer, etc. may also be included. The aforementioned devices are examples and others may be used. The computing device 600 may include one or more communication connections 616 allowing communications with other computing devices 650. Examples of the communication connections 616 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program tools. The system memory 604, the removable storage device 609, and the non-removable storage device 610 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program tools, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIG. 7 illustrates a computing device 702, for example, a mobile telephone, a smart phone, wearable computer (such as a smart watch), a tablet computer, a laptop computer, and the like, with which aspects of the disclosure may be practiced. In some aspects, the client computer device utilized by a user (e.g., the client computing device 102 as shown in the system 100 in FIG. 1) may be a mobile computing device. In a basic configuration, the computing device 702 typically includes a display 710 and a keypad 735 (e.g., a keyboard). In embodiments, the display 710 may also function as an input device (e.g., a touch screen display). In various aspects, the output elements of the computer device 702 include the display 710 for showing a graphical user interface (GUI), a visual indicator 720 (e.g., a light emitting diode), and/or an audio interface 774 (e.g., a speaker). In some aspects, the computing device 702 incorporates a vibration transducer for providing the user with tactile feedback. In yet another aspect, the computing device 702 incorporates input and/or output ports, such as an audio input (e.g., a microphone jack), an audio output (e.g., a headphone jack), and a video output (e.g., a HDMI port) for sending signals to or receiving signals from an external device.

One or more application programs 766 may be loaded into the memory 762 and run on or in association with the operating system 764. Examples of the application programs include phone dialer programs, e-mail programs, information management (PIM) programs, word processing programs, spreadsheet programs, Internet browser programs, messaging programs, and so forth. The computing device 702 also includes a non-volatile storage area 768 within the memory 762. The non-volatile storage area 768 may be used to store persistent information that should not be lost if the computing device 702 is powered down. The application programs 766 may use and store information in the non-volatile storage area 768, such as e-mail or other messages used by an e-mail application, and the like. As should be appreciated, other applications may be loaded into the memory 762 and run on the computing device 702 described herein.

The computing device 702 has a power supply 770, which may be implemented as one or more batteries. The power supply 770 might further include an external power source, such as an AC adapter or a powered docking cradle that supplements or recharges the batteries.

The computing device 702 may also include a radio interface layer 772 that performs the function of transmitting and receiving radio frequency communications. The radio interface layer 772 facilitates wireless connectivity between the computing device 702 and the "outside world" via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 720 (e.g., LED) may be used to provide visual notifications, and/or an audio interface 774 may be used for producing audible notifications via the audio interface 774. In the illustrated configuration, the visual indicator 720 is a light emitting diode (LED) and the audio interface 774 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. The audio interface 774 may also be coupled to a microphone to receive audible input, such as to facilitate a telephone conversation. In accordance with aspects of the present disclosure, the microphone may also serve as an audio sensor to facilitate control of notifications. The system 702 may further include a video interface 776 that enables an operation of devices connected to a peripheral device port 730 to record still images, video stream, and the like.

The computing device 702 may have additional features or functionality. For example, the computing device 702 may also include additional data storage devices (removable and/or non-removable) such as, magnetic disks, optical disks, or tape. Such additional storage is illustrated in FIG. 7 by the non-volatile storage area 768.

Data/information generated or captured by computing device 702 may be stored locally on the computing device 702, as described above, or the data may be stored on any number of storage media that may be accessed by the device via the radio interface layer 772 or via a wired connection between the computing device 702 and a separate computing device associated with the computing device 702, for example, a server computer in a distributed computing network, such as the Internet. As should be appreciated such data/information may be accessed via the computing device 702 via the radio interface layer 772 or via a distributed computing network. Similarly, such data/information may be readily transferred between computing devices for storage and use according to well-known data/information transfer and storage means, including electronic mail and collaborative data/information sharing systems.

The description and illustration of one or more aspects provided in this application are not intended to limit or restrict the scope of the disclosure as claimed in any way. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The present disclosure relates to systems and methods for dynamically selecting a proxy processor for processing a data feed according to at least the examples provided in the sections below. A computer-implemented method comprises displaying a data feed having an automatically updated list of a plurality of items to an end user; receiving a selection of an item of the plurality of items in a data feed; for the selected item, determining a recommendation score for each of a plurality of proxy processors; selecting, based on the recommendation score, a designated proxy processor; sending a request to acquire the selected item to the designated proxy processor; and receiving transaction completion acknowledgement from the designated proxy processor.

In aspects, the recommendation score is based on a weighted sum of a plurality of parameters associated with each of the plurality of proxy processors. With respect to other aspects, the plurality of parameters includes a price of an item, a shipping fee, and a shipping time and/or inventory of the selected item. Any of the one or more above aspects in combination with any other of the one or more aspect. Any of the one or more aspects as described herein.

What is claimed is:

1. A computer implemented method, performed by at least one processor, for automatically selecting a proxy processor for processing a request to acquire an item, the method comprising:

causing, by the at least one processor, display of a data feed having an automatically updated list of a plurality of items to an end user;

receiving, by the at least one processor, a selection of an item of the plurality of items in the data feed the selection received via the data feed;

based on the selected item, determining, by the at least one processor, a recommendation score for each of a plurality of proxy processors;

selecting, by the at least one processor and based on the recommendation score, a designated proxy processor;

sending, by the at least one processor, to the designated proxy processor an indication of the selected item;

receiving, by the at least one processor, from the designated proxy processor, information regarding the selected item; and causing display, by the at least one processor and within the data feed, of the information regarding the selected item received from the proxy processor, the information displayed within the data feed, without redirecting the user away from the data feed.

2. The computer implemented method of claim 1, wherein the recommendation score is based on a weighted sum of a plurality of parameters associated with each of the plurality of proxy processors.

3. The computer implemented method of claim 2, wherein the plurality of parameters includes a price of an item, a shipping fee, a shipping time, or whether each proxy processor and one or more item providers associated with each proxy processor have an inventory of the selected item.

4. The computer implemented method of claim 2, further comprising:

ranking the plurality of proxy processors based on their corresponding recommendation scores and selecting, as the designated proxy processor the highest ranked proxy processor.

5. The computer implemented method of claim 2, wherein the selecting a designated proxy processor comprises using a trained machine learning model to select the designated proxy processor based on the plurality of parameters.

6. The computer implemented method of claim 1, further comprising:

receiving a selection of a second item of the plurality of items in the data feed, the selected item being provided by an item provider that is distinct from a second item provider of the selected second item;

sending to the designated proxy processor an indication of the selected second item;

receiving, from the designated proxy processor, information regarding the selected second item including an indication of the second item provider; and further displaying, via the data feed, the information regarding the second selected item received from the designated proxy processor including the indication of the second item provider, wherein the information received from the designated proxy processor and displayed regarding the selected item includes an indication of the item provider, and wherein the recommendation score for each of the plurality of proxy processors is further determined based on the second selected item.

7. The computer implemented method of claim 1, further comprising:

sending a request to acquire the selected item to the designated proxy processor; and receiving transaction completion acknowledgement regarding the acquisition of the selected item from the designated proxy processor.

8. The computer implemented method of claim 7, wherein the data feed is a shopping feed, the item represents a product item, the designated proxy processor corresponds to at least a part of a payment gateway for processing acquisition of the product item, the plurality of parameters used for determining the recommendation score includes a price of the product item, a shipping time of the product item, and an inventory status of the product item, and the acquisition of the selected item includes authenticating a user and the product item and authorizing access to the product item.

9. The computer implemented method of claim 7, wherein sending the request to acquire the selected item causes authenticating a user and authorizing an access to the selected item in exchange for a resource associated with the user.

10. The computer implemented method of claim 7, wherein the transaction completion acknowledgement includes a first result of authenticating a user and a second result associated with authorizing the user an access to the selected item.

11. The computer implemented method of claim 1:

wherein the indication of the selected item sent to the designated proxy processor further includes a request to acquire the selected item; and wherein the information regarding the selected item that is received from the designated proxy processor and displayed comprises a transaction completion acknowledgement.

12. A system comprising:

at least one processor; and memory comprising computer-executable instructions that when executed by the at least one processor perform operations comprising:

causing display of a shopping feed that includes an automatically updated list of a plurality of product items;

receiving a selection of a product item of the plurality of product items in the shopping feed, the selection received via the shopping feed;

evaluating a plurality of proxy processors;

selecting, based on the evaluation, a designated proxy processor;

sending to the designated proxy processor an indication of the selected product item;

receiving, from the designated proxy processor, information regarding the selected product item; and causing display of the information regarding the selected product item received from the designated proxy processor, the information displayed within the shopping feed, without redirecting the user away from the shopping feed.

13. The system of claim 12, wherein evaluating the plurality of proxy processors comprises:

determining, based on a weighted sum of a plurality of parameters associated with each proxy processor of the plurality of proxy processors, a recommendation score;

ranking each proxy processor in the plurality of proxy processors based on the determined recommendation score of the proxy processor; and wherein selecting the designated proxy processor comprises selecting the highest ranked proxy processor according to the evaluation.

14. The system of claim 13, wherein the plurality of parameters includes a price of a product item, a shipping fee, a shipping time, or whether the proxy processor and one or more retailers associated with the proxy processor have an inventory of the selected product item.

15. The system of claim 13, wherein the operations further comprise:

receiving a selection of a second product item of the plurality of product items in the shopping feed, the selected product item being provided by an item provider that is distinct from a second item provider of the selected second product item;

sending to the designated proxy processor an indication of the selected second product item;

receiving, from the designated proxy processor, information regarding the selected second product item including an indication of the second item provider; and causing to further display, via the shopping feed, the information regarding the second selected product item received from the designated proxy processor including the indication of the second item provider, wherein the information received from the designated proxy processor and caused to be displayed regarding the selected item includes an indication of the item provider, and wherein the evaluation of the plurality of proxy processors is determined based on the selected product item and the second selected product item.

16. The system of claim 12, wherein the operations further comprise:

sending a request to acquire the selected product item to the designated proxy processor; and receiving transaction completion acknowledgement regarding the acquisition of the selected product item from the designated proxy processor.

17. A device for a shopping feed, comprising:

a memory; and a processor configured to execute a method comprising:

displaying the shopping feed;

receiving a first interactive selection of a first product item in the shopping feed, wherein the first product item is available from a first retailer, and the first retailer is associated with a proxy processor as a payment gateway;

receiving a second interactive selection of a second product item in the shopping feed, wherein the second product item is available from a second retailer, and the second retailer is associated with the proxy processor;

transmitting the first interactive selection and the second interactive selection to a data feed processor;

based on the first and second interactive selection, automatically selecting, by the data feed processor, the proxy processor as a designated proxy processor;

sending to the designated proxy processor an indication of the first product item and an indication of the second product item;

receiving, from the designated proxy processor, information regarding the first product item and the second product item;

displaying, within the shopping feed, the information regarding the first product item and the second product item.

18. The device of claim 17, wherein the shopping feed includes a plurality of product items in a horizontally scrollable list of product items; and wherein the designated proxy processor is selected from a plurality of proxy processors.

19. The device of claim 17, wherein sending the indication of the first product item and the indication of the second product item further includes sending a request to acquire the first product item and the second product item; and wherein the information regarding the first product item and the second product item that is received from the designated proxy processor comprises a confirmation indicating that the first product item was acquired from the first retailer and the second product item was acquired from the second retailer.

20. The device of claim 19, wherein the request to acquire the first product item and the second product item comprises a request to authenticate a user associated with the first and second interactive selections.

* * * * *